US009701817B2

(12) United States Patent
Wertz

(10) Patent No.: US 9,701,817 B2
(45) Date of Patent: Jul. 11, 2017

(54) PHOTOISOMERIZING POLYMERS

(71) Applicant: International Business Machines Corporation, Armonk, NY (US)

(72) Inventor: Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/730,804

(22) Filed: Jun. 4, 2015

(65) Prior Publication Data
US 2016/0355669 A1 Dec. 8, 2016

(51) Int. Cl.
| C08F 2/46 | (2006.01) |
| C08F 2/50 | (2006.01) |
| C08G 61/04 | (2006.01) |
| C08K 5/5415 | (2006.01) |
| C08G 73/02 | (2006.01) |
| B01D 15/26 | (2006.01) |
| C08G 69/28 | (2006.01) |

(52) U.S. Cl.
CPC ............ C08K 5/5415 (2013.01); B01D 15/26 (2013.01); C08G 69/28 (2013.01); C08G 73/0213 (2013.01)

(58) Field of Classification Search
CPC .................. C08K 5/5415; C08G 73/0213
USPC ............... 522/83, 71, 189, 184, 1; 520/1
See application file for complete search history.

(56) References Cited

U.S. PATENT DOCUMENTS

| 8,405,477 B2 | 3/2013 | Ogrin et al. |
| 8,686,818 B2 | 4/2014 | Dieny et al. |
| 8,768,501 B2 | 7/2014 | Fischer et al. |
| 2013/0084569 A1 | 4/2013 | Wang et al. |
| 2013/0241344 A1 | 9/2013 | Wang |
| 2014/0058069 A1 | 2/2014 | Mizrahi et al. |
| 2015/0122734 A1* | 5/2015 | Riman .................. C22B 3/0005 210/643 |

FOREIGN PATENT DOCUMENTS

| CN | 103887030 A | 6/2014 |
| WO | 2013-185002 | * 12/2013 |

OTHER PUBLICATIONS

Xie et al, Recent Developments in Aromatic Azo Polymers Research, 1993, Chem. Mater., 5, 403-411.*
Natali et al, Molecular switches as photocontrollable "smart" receptors, 2012, Chem. Soc. Rev., 41, 4010-4029.*
List of IBM Patents or Patent Applications Treated as Related, Jun. 4, 2015.
Bogush, et al., "Preparation of Monodisperse Silica Particles: Control of Size and Mass Fraction", Journal of Non-Crystalline Solids, vol. 104, 1988, pp. 95-106.
Golestanian, et al., "Designing Phoretic Micro- and Nano-Swimmers", New Journal of Physics, 2007, 8 pp.
Jiang, et al., "Solvent-Free Synthesis of Janus Colloidal Particles", Langmuir 2008, vol. 24, pp. 10073-10077.
Koschinsky, et al., "Importance of Different Types of Marine Particles for the Scavenging of Heavy Metals in the Deep-Sea Bottom Water", Applied Geochemistry, 2003, vol. 18, pp. 693-710.
Langer, Robert, "Drug Delivery and Targeting", Nature, Apr. 1998, vol. 392, 6 pp.
Morgan, et al., "Researches on Residual Affinity and Co-Ordination. Part II. Acetylacetones of Selenium and Tellurium", Journal.of Chemical Society, Jan. 1920, vol. 117, pp. 1456-1465.
Palagi, et al., "Design and Development of a Soft Magnetically-Propelled Swimming Microrobot", 2011 IEEE International Conference on Robotics and Automation, Shanghai International Conference Center, May 9-13, 2011, Shanghai, China, 6 pages.
Perro, et al., "Production of Large Quantities of "Janus" Nanoparticles Using Wax-in-Water Emulsions", Colloids and Surfaces A: Physicochemical and Engineering Aspects, 2009, vol. 332, pp. 57-62.
Ryan, et al., "Polymers: The Quest for Motility", Materials Today, Jul. 2008, vol. 11, 4 pp.
Stöber, et al., "Controlled Growth of Monodisperse Silica Spheres in the Micron Size Range", Journal of Colloid and Interface Science, 1968, vol. 26, 8 pp.
Xie, et al., "Recent developments in Aromatic Azo Polymers Research", American Chemical Society, 1993, vol. 5, pp. 403-411.
Zhang, et al. "Motion Control of Artificial Bacterial Flagella", 10th International IEEE Conference on Nanotechnology—Joint Symposium with Nano Korea 2010, Aug. 17-20, 2010, KINEX-Korea, 4 pages.
Zhang, et al., "Micromanipulation Using Artificial Bacterial Flagella", The 2009 IEEE/RSJ International Conference on Intelligent Robots and Systems, Oct. 11-15, 2009, St. Louis, MO, 6 pages.

* cited by examiner

*Primary Examiner* — Jessica E Whiteley
(74) *Attorney, Agent, or Firm* — Patterson + Sheridan, LLP

(57) ABSTRACT

In an example, a composition of matter includes a particle, a photoisomerizing polymer bonded to a first portion of the particle, and a chelating material bonded to a second portion of the particle.

13 Claims, 7 Drawing Sheets

PHOTOISOMERIZING POLYMERS

I. FIELD OF THE DISCLOSURE

The present disclosure relates generally to photoisomerizing polymers.

II. BACKGROUND

Living organisms may swim with various movements from a contracting/expanding motion to the "wiggling" of a flagellum. An "artificial swimmer" that is able to mimic movements of a living organism may be useful in various contexts (e.g., drug delivery). However, there may be challenges associated with manufacturing such an artificial swimmer that is able to mimic the multiple-directional movement ability of a living organism.

III. SUMMARY OF THE DISCLOSURE

According to an embodiment, a composition of matter is disclosed. The composition of matter includes a particle, a photoisomerizing polymer, and a chelating material. The photoisomerizing polymer is bonded to a first portion of the particle, and the chelating material is bonded to a second portion of the particle.

According to another embodiment, a process of forming a photoisomerizing azobenzene polymer is disclosed. The process includes chemically reacting an azobenzene material that includes at least two chlorocarbonyl functional groups with an amine to form a photoisomerizing azobenzene polymer. The photoisomerizing azobenzene polymer has a polymer chain that includes a first chlorocarbonyl group, a plurality of repeating azobenzene monomer units, and a second chlorocarbonyl group. The first chlorocarbonyl group is disposed at a first end of the polymer chain, and the second chlorocarbonyl group is disposed at a second end of the polymer chain.

According to another embodiment, a process of removing metal ions from a solution is disclosed. The process includes adding a composition of matter to a solution that includes a plurality of metal ions. The composition of matter includes a particle, a photoisomerizing polymer bonded to a first portion of the particle, and a chelating material bonded to a second portion of the particle. The chelating material includes one or more functional groups to bond one or more metal ions of the plurality of metal ions to the second portion of the particle. The process further includes exposing the solution to light after adding the composition of matter to the solution. Exposing the solution to light having a first wavelength induces a first change of configuration of monomer units of the photoisomerizing polymer from a first configuration to a second configuration. Exposing the solution to light having a second wavelength induces a second change of configuration of monomer units of the photoisomerizing polymer from the second configuration to the first configuration.

One advantage of the present disclosure is the ability to induce motion in a composition of matter (referred to herein as an "artificial swimmer") via changes of configuration of monomer units of a photoisomerizable polymer resulting from exposure to different wavelengths of light. Another advantage of the present disclosure is the ability of the artificial swimmer to "scavenge" metal ions from a solution using a chelating material as the artificial swimmer moves in various directions in the solution.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 6:
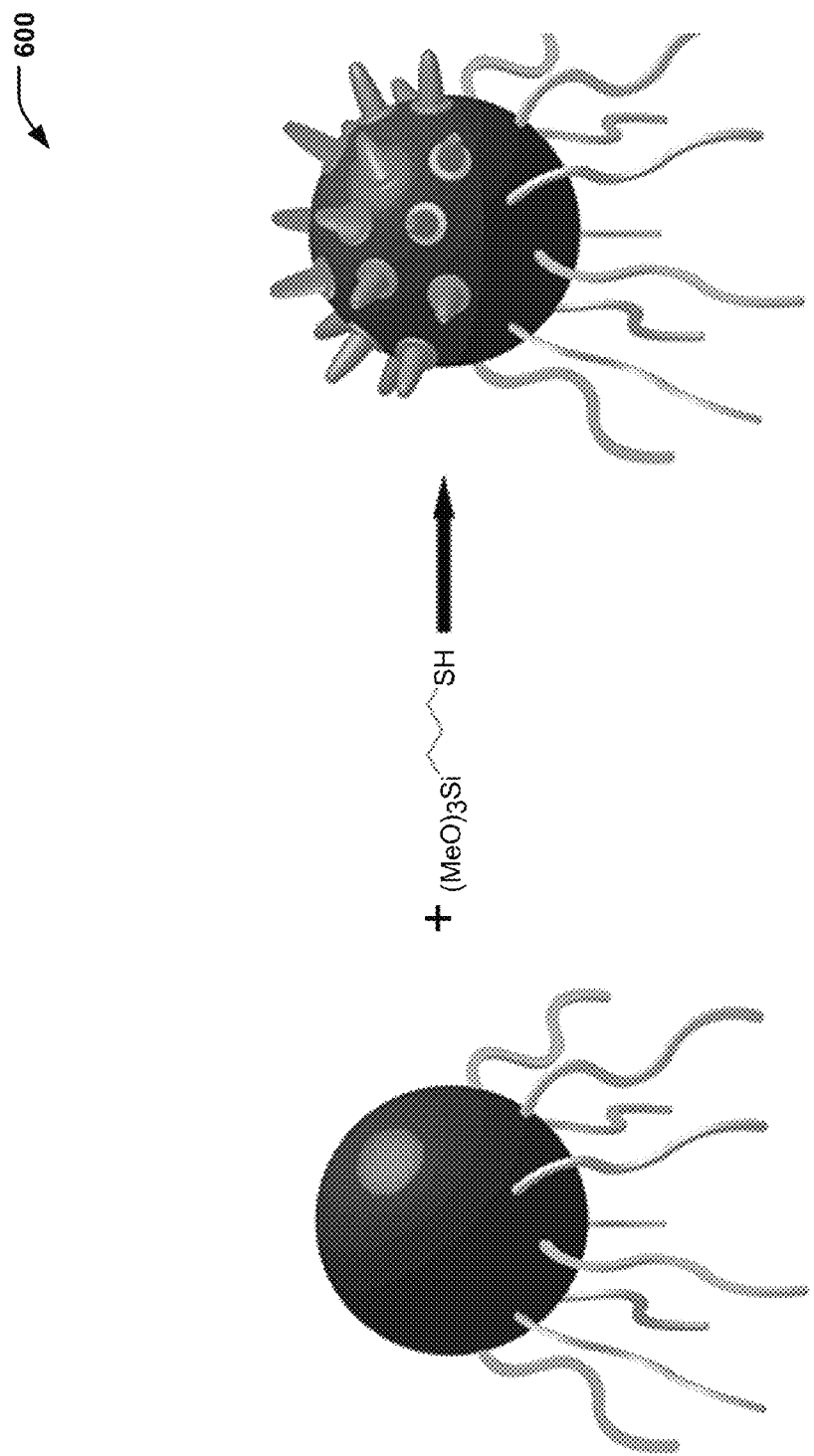
Figure 7:
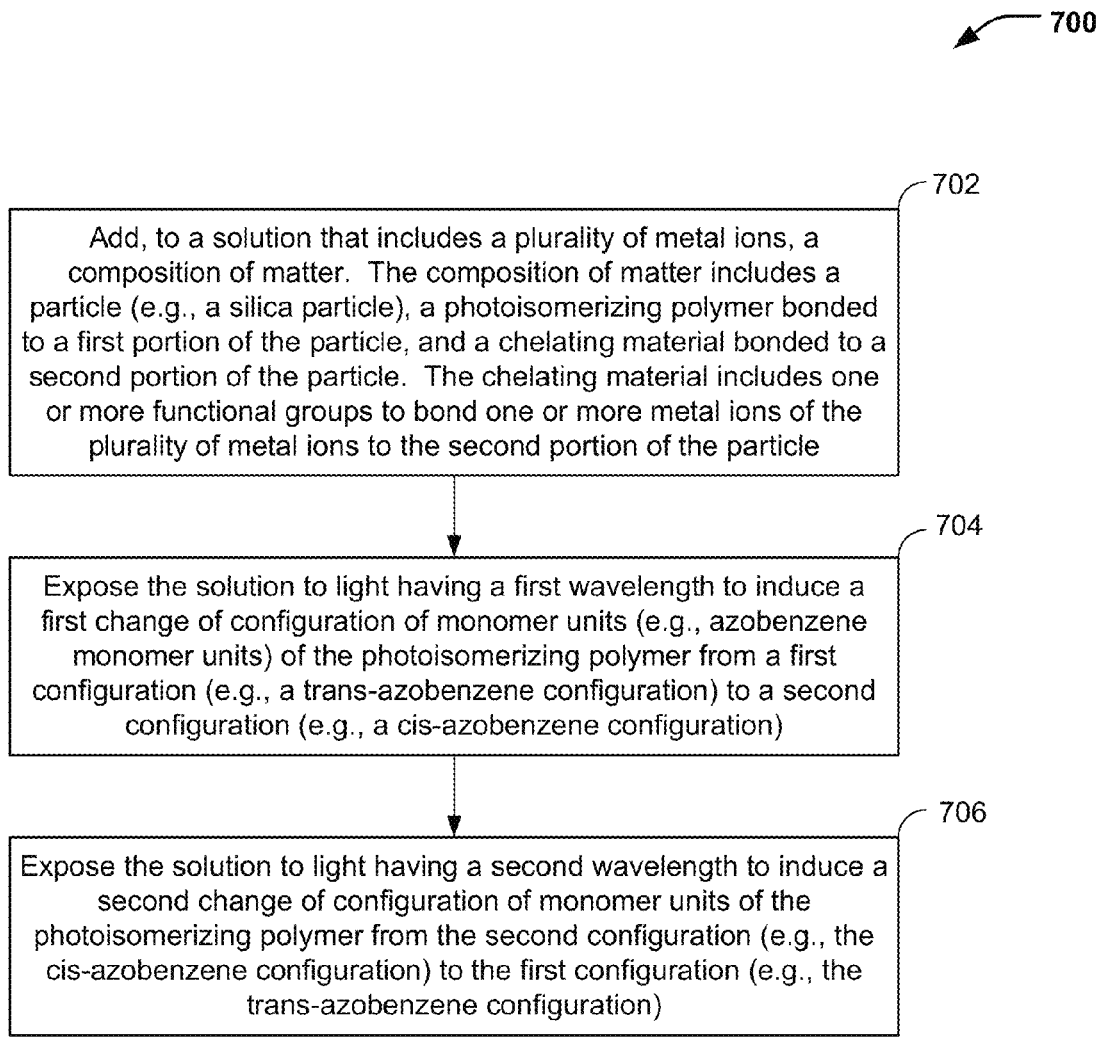

FIG. 6 is a diagram showing the addition of a chelating material to a second portion of the particle, according to one embodiment; and FIG. 7 is a flow diagram showing a particular embodiment of a process of removing metal ions from a solution, using a composition of matter that includes a particle, a photoisomerizing polymer bonded to a first portion of the particle, and a chelating material bonded to a second portion of the particle.

V. DETAILED DESCRIPTION

The present disclosure relates to photoisomerizing polymers (e.g., photoisomerizing azobenzene polymers) and compositions of matter that include the photoisomerizing polymers. In the present disclosure, a composition of matter that includes a particle (e.g., a silica particle) having a photoisomerizing polymer bonded to a first portion of the particle (e.g., a "tail" portion of the particle) and a chelating material bonded to a second portion of the particle (e.g., a "head" portion of the particle) is also referred to as an "artificial swimmer." While the present disclosure refers to a silica particle (e.g., for addition of surface functionalities such as amine groups to the first portion of the particle), it will be appreciated that alternative particles may be utilized (e.g., for addition of alternative/additional surface functionalities to the first portion of the particle).

A potential use of the artificial swimmers of the present disclosure is "scavenging" of metal ions (e.g., transition metal ions) from a solution via chelation of the metal ions (using the chelating material at the "head" portion of the artificial swimmer). To illustrate, artificial swimmers may be added to a solution that includes metal ions and induced to "swim" via application of various wavelengths of light. In the case of a photoisomerizing azobenzene polymer, application of a first wavelength of light (or a first wavelength range) may cause azobenzene monomer units of a polymer chain to change from a cis-azobenzene state/configuration to a trans-azobenzene state/configuration. Application of second wavelength of light (or a second wavelength range) may cause azobenzene monomer units of the polymer chain to change from the trans-azobenzene state/configuration to the cis-azobenzene state/configuration. The changes of configuration may allow for movement of the artificial swimmer in various directions in a solution (in addition to a "default" direction associated with sedimentation). By switching a light source (or multiple light sources) between the first wavelength (e.g., about 365 nm) and the second wavelength (e.g., about 420 nm), the artificial swimmer may be induced to sink or swim in the solution to scavenge metal ions from the solution. This process of scavenging metal ions from the solution may be more efficient than methods that rely on metal ion capture during sedimentation alone, as sedimentation may allow for capture of a limited number of metal ions before reaching a final resting state.

Figure 1:
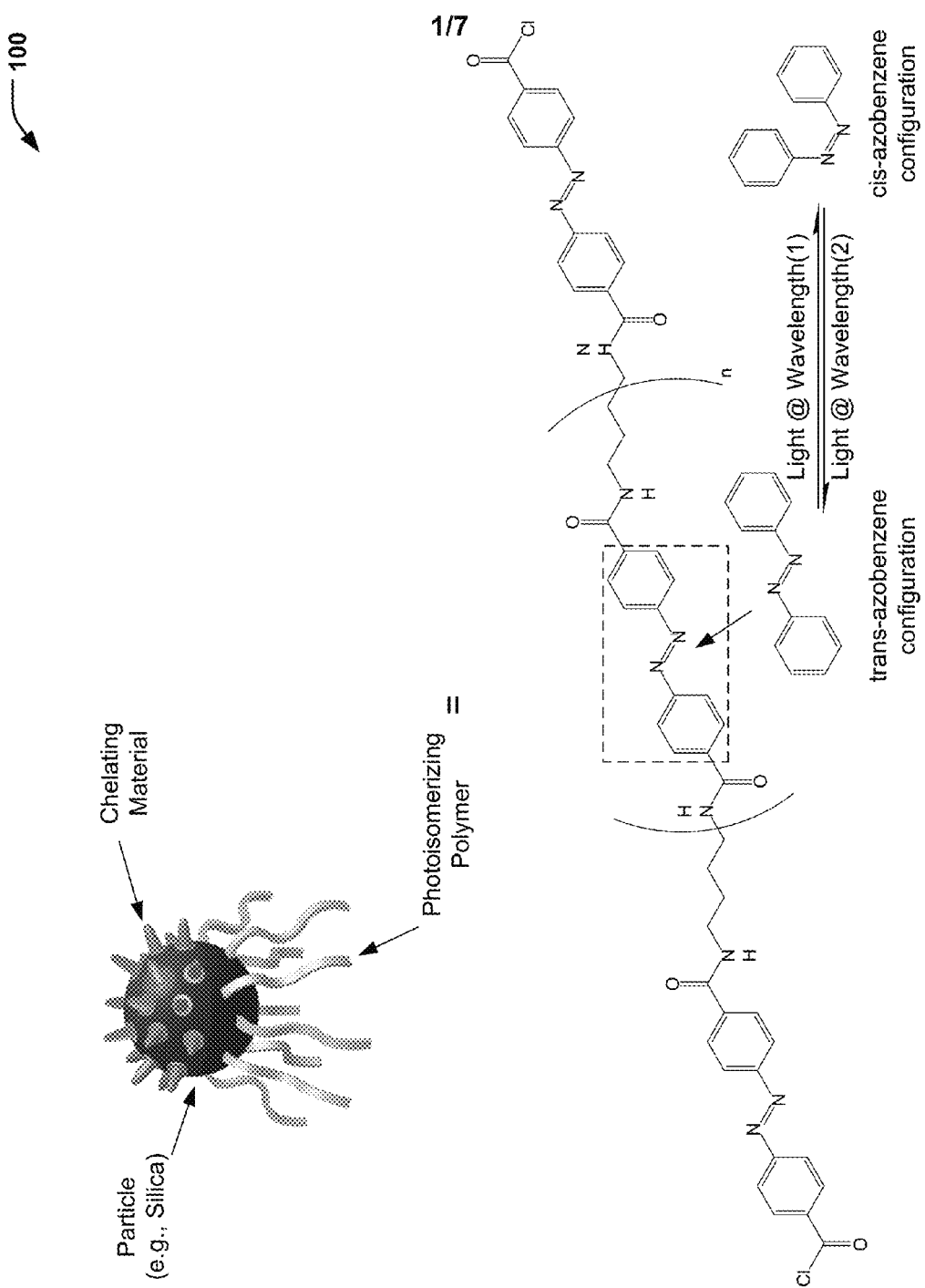
FIG. 1 is a diagram showing a composition of matter that includes a particle, a photoisomerizing polymer bonded to a first portion of the particle, and a chelating material bonded to a second portion of the particle, according to one embodiment.

FIG. 1 is a diagram 100 showing a composition of matter that includes a particle (e.g., a silica particle), a photoisomerizing polymer bonded to a first portion of the particle, and a chelating material bonded to a second portion of the particle, according to one embodiment. The composition of matter illustrated in FIG. 1 is also referred to herein as an "artificial swimmer," with the first portion of the particle associated with a "tail" portion of the artificial swimmer and the second portion of the particle associated with a "head" portion of the artificial swimmer. As further described herein, monomer units in the tail portion of the artificial swimmer may undergo changes of configuration when exposed to different wavelengths of light. Such changes of configuration may result in changes of spatial position (e.g., "swimming") of the artificial swimmer in a solution. When the solution includes metal ions, the artificial swimmer may "scavenge" metal ions from the solution via a chemical reaction with functional group(s) associated with the chelating material in the head portion of the artificial swimmer.

In a particular embodiment, the particle has a characteristic dimension (e.g., an average diameter) in a range of about 100 nanometers to about 1 micrometer. As described further herein with respect to FIG. 4, the particle may include a silica particle that is prepared through a modified Stöber et al. synthesis (among other alternative processes). As illustrated and described further herein with respect to FIGS. 4 and 5, a second portion (the "head") of the particle may be encapsulated within a wax (or other material) while a first portion (the "tail") of the particle is exposed in order to allow the photoisomerizing polymer to be bonded to the first portion of the particle. As illustrated and described further herein with respect to FIG. 5, after bonding the photoisomerizing polymer to the first portion of the particle, the wax (or other material) may be removed in order to expose the second portion of the particle. As illustrated and described further herein with respect to FIG. 6, exposure of the second portion of the particle allows the chelating material to be bonded to the second portion of particle, resulting in the "artificial swimmer" illustrated in FIG. 1.

In the particular embodiment illustrated in FIG. 1, the photoisomerizing polymer that is bonded to the first portion of the particle includes a photoisomerizing azobenzene polymer (that includes a plurality of azobenzene monomer units, represented by the integer value n). For illustrative purposes, FIG. 1 illustrates that an azobenzene monomer unit of the photoisomerizing azobenzene polymer may be in a first configuration (e.g., a trans-azobenzene configuration) or a second configuration (e.g., a cis-azobenzene configuration). In a particular embodiment, the photoisomerizing azobenzene polymer illustrated in FIG. 1 may be formed according to a process that is further described herein with respect to FIG. 3.

FIG. 1 further illustrates that exposure to different wavelengths of light may result in changes of configuration of individual azobenzene monomer units of the photoisomerizing azobenzene polymer. As an example, an azobenzene monomer unit may undergo a change of configuration from the trans-azobenzene configuration to the cis-azobenzene configuration when exposed to a first wavelength of light. As another example, an azobenzene monomer unit may undergo a change of configuration from the cis-azobenzene configuration to the trans-azobenzene configuration when exposed to a second wavelength of light. While FIG. 1 illustrates the change of configuration for a single azobenzene monomer unit, it will be appreciated that multiple azobenzene monomer units of the photoisomerizing azobenzene polymer may undergo changes of configuration (e.g., at substantially the same time when exposed to light having a particular wavelength).

As an example, the first wavelength of light (associated with a change of configuration from the trans-azobenzene configuration to the cis-azobenzene configuration) may be about 365 nanometers. As another example, the second wavelength of light (associated with a change of configuration from the cis-azobenzene configuration to the trans-azobenzene configuration) may be about 420 nanometers. As illustrated and further described herein with respect to FIG. 2, the changes in configuration associated with exposure to different wavelengths of light may result in changes of spatial position of the artificial swimmer in solution for improved metal ion scavenging from solution. While the present disclosure refers to a chelating material for scavenging metal ions from solution, it will be appreciated that alternative materials (e.g., amines, thiols, etc.) may be utilized for scavenging non-metals or to target specific chemicals in solution.

Figure 2:
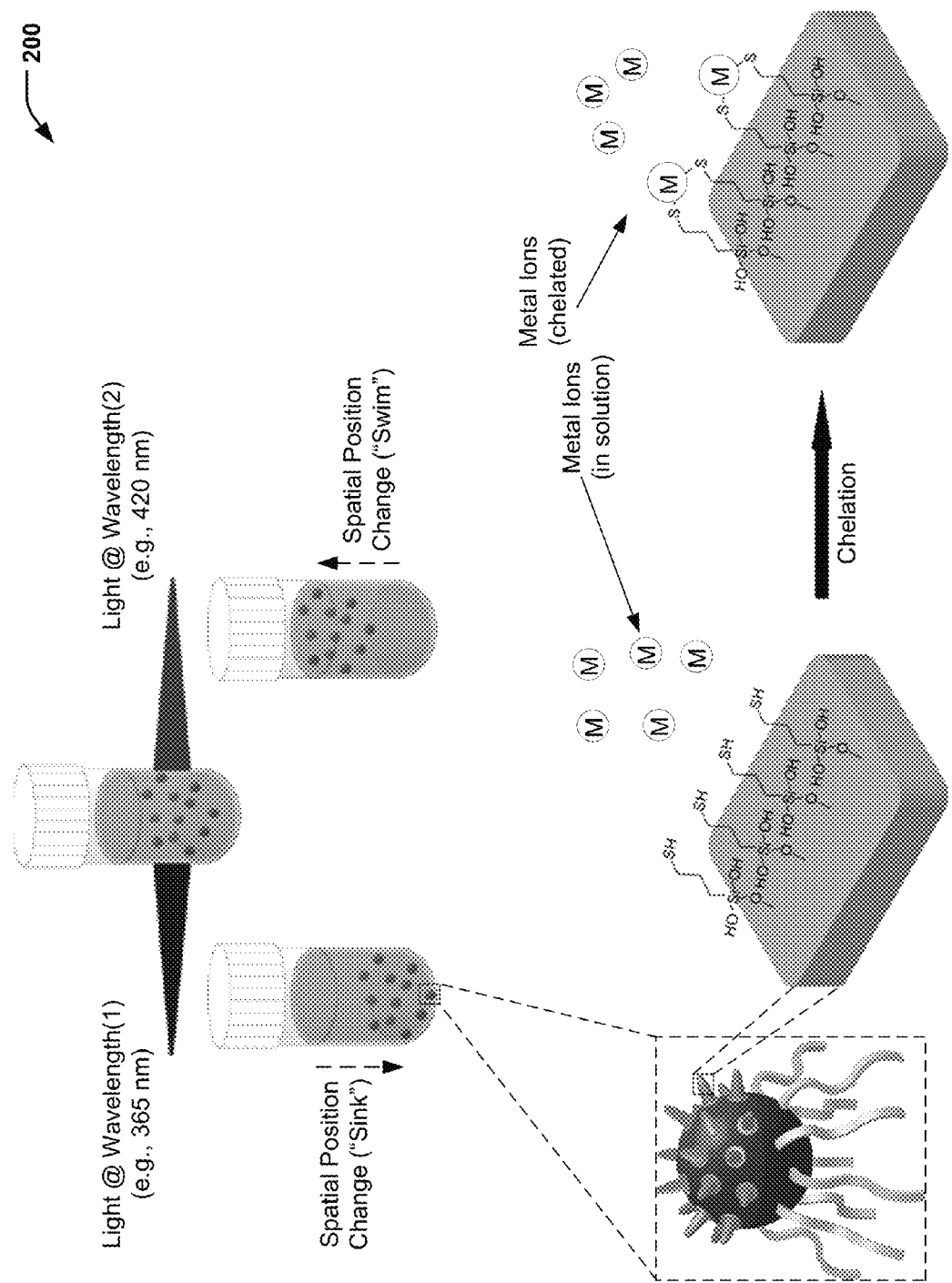
FIG. 2 is a diagram that illustrates the composition of matter of FIG. 1 being utilized to remove metal ions from solution, according to one embodiment.

As illustrated and further described herein with respect to FIG. 2, the chelating material may include one or more functional groups to bond metal ion(s) to the artificial swimmer in order to scavenge the metal ion(s) from solution. In a particular embodiment, the functional group(s) of the chelating material include one or more silane groups (as shown in the example of FIG. 2). In some cases, the silane group(s) may bond with metal ion(s), such as a mercury (Hg) ion, a silver (Ag) ion, a lead (Pb) ion, a cadmium (Cd) ion, a thallium (Tl) ion, or a combination thereof.

Thus, FIG. 1 illustrates an example of a composition of matter (such as the artificial swimmer) that includes a particle (e.g., a silica particle), a photoisomerizing polymer bonded to a first portion (the "tail") of the particle, and a chelating material bonded to a second portion (the "head") of the particle.

FIG. 2 is a diagram 200 that illustrates the composition of matter of FIG. 1 (the artificial swimmer) being utilized to remove metal ions from solution. In FIG. 2, a change of configuration of monomer units (e.g., azobenzene monomer units) of the photoisomerizing polymer of the artificial swimmer may result in changes of spatial position within a solution. The changes of spatial position may allow the artificial swimmer to "sink" and/or "swim" in the solution, allowing metal ion(s) to be "scavenged" from the solution using the chelating material of the artificial swimmer.

FIG. 2 illustrates that the composition of matter of FIG. 1 (the artificial swimmer) may be added to a solution that includes a plurality of metal ions. For example, the metal ions may include a mercury (Hg) ion, a silver (Ag) ion, a lead (Pb) ion, a cadmium (Cd) ion, a thallium (Tl) ion, or a combination thereof. In the particular embodiment illustrated in FIG. 2, one or more functional groups of the chelating material include one or more silane groups. In other cases, the chelating material may include alternative and/or additional functional groups to bind metal ion(s) from solution.

FIG. 2 illustrates that, after adding the composition of matter of FIG. 1 to the solution, the solution may be exposed to light having a first wavelength to induce a first change of configuration of monomer units of the photoisomerizing polymer from a first configuration to a second configuration. As an example, the first configuration may correspond to the trans-azobenzene configuration illustrated in FIG. 1. In this case, the first wavelength of light may correspond to a wavelength of about 365 nm that may induce a transition from the trans-azobenzene configuration to the cis-azobenzene configuration. FIG. 2 also illustrates that exposing the solution to light having a second wavelength may induce a second change of configuration of monomer units of the photoisomerizing polymer from the second configuration to the first configuration. As an example, the second configuration may correspond to the cis-azobenzene configuration illustrated in FIG. 1. In this case, the second wavelength of light may correspond to a wavelength of about 420 nm that may induce a transition from the cis-azobenzene configuration to the trans-azobenzene configuration.

As an illustrative, non-limiting example, the solution may be exposed to light having the first wavelength (e.g., about 365 nm), resulting in a first change of configuration of at least some monomer units (e.g., from a trans-azobenzene configuration to a cis-azobenzene configuration). The solution may then be exposed to light having the second wavelength (e.g., about 420 nm), resulting in a second change of configuration of at least some monomer units (e.g., from the cis-azobenzene configuration to the trans-azobenzene configuration). As an illustrative, non-limiting example, a change of configuration of azobenzene monomer units may substantially complete within about 10 seconds (or less in some cases). Accordingly, in a particular embodiment, an amount of time between exposure to different wavelengths of light may be in a range of about 1 to 10 seconds, such as about 1 second, about 2 seconds, about 3 seconds, about 4 seconds, about 5 seconds, about 6 seconds, about 7 seconds, about 8 seconds, about 9 seconds, or about 10 seconds. The first change of configuration and the second change of configuration results in a first change of spatial position of the particle in the solution. For example, the first change of spatial position of the particle may be in a first direction that is different from a second direction associated with sedimentation after metal ion capture by the chelating material. While FIG. 2 identifies one spatial position change as "sinking" and another spatial position change as "swimming," it will be appreciated that the change of spatial position resulting from the changes of configuration may be in various directions that may be different from a "default" change of spatial position associated with gravity/sedimentation.

To further illustrate, after the first change of configuration and the second change of configuration, the solution may be exposed to light having the first wavelength (e.g., about 365 nm), resulting in a third change of configuration of at least some monomer units (e.g., from the trans-azobenzene configuration to the cis-azobenzene configuration). The solution may then be exposed to light having the second wavelength (e.g., about 420 nm), resulting in a fourth change of configuration of at least some monomer units (e.g., from the cis-azobenzene configuration to the trans-azobenzene configuration). The third change of configuration and the fourth change of configuration results in a second change of spatial position of the particle. For example, the second change of spatial position of the particle may be in a third direction that is different from the second direction associated with sedimentation after metal ion capture by the chelating material. It will be appreciated that further exposure of the solution to light at different wavelengths may induce further changes of spatial position of the artificial swimmer in the solution.

Thus, FIG. 2 illustrates that exposing a solution that includes the artificial swimmers to different wavelengths of light may cause a change of structure of the photoisomerizing polymer in the "tail" portion of the artificial swimmers. Changing the wavelength at a particular rate (e.g., in a range of about 1 to 10 seconds) may allow for movement of the artificial swimmer in the solution to allow for more metal/swimmer interactions, in order to allow for improved metal ion scavenging compared to metal ion chelation methods that rely on capture during sedimentation alone.

Figure 3:
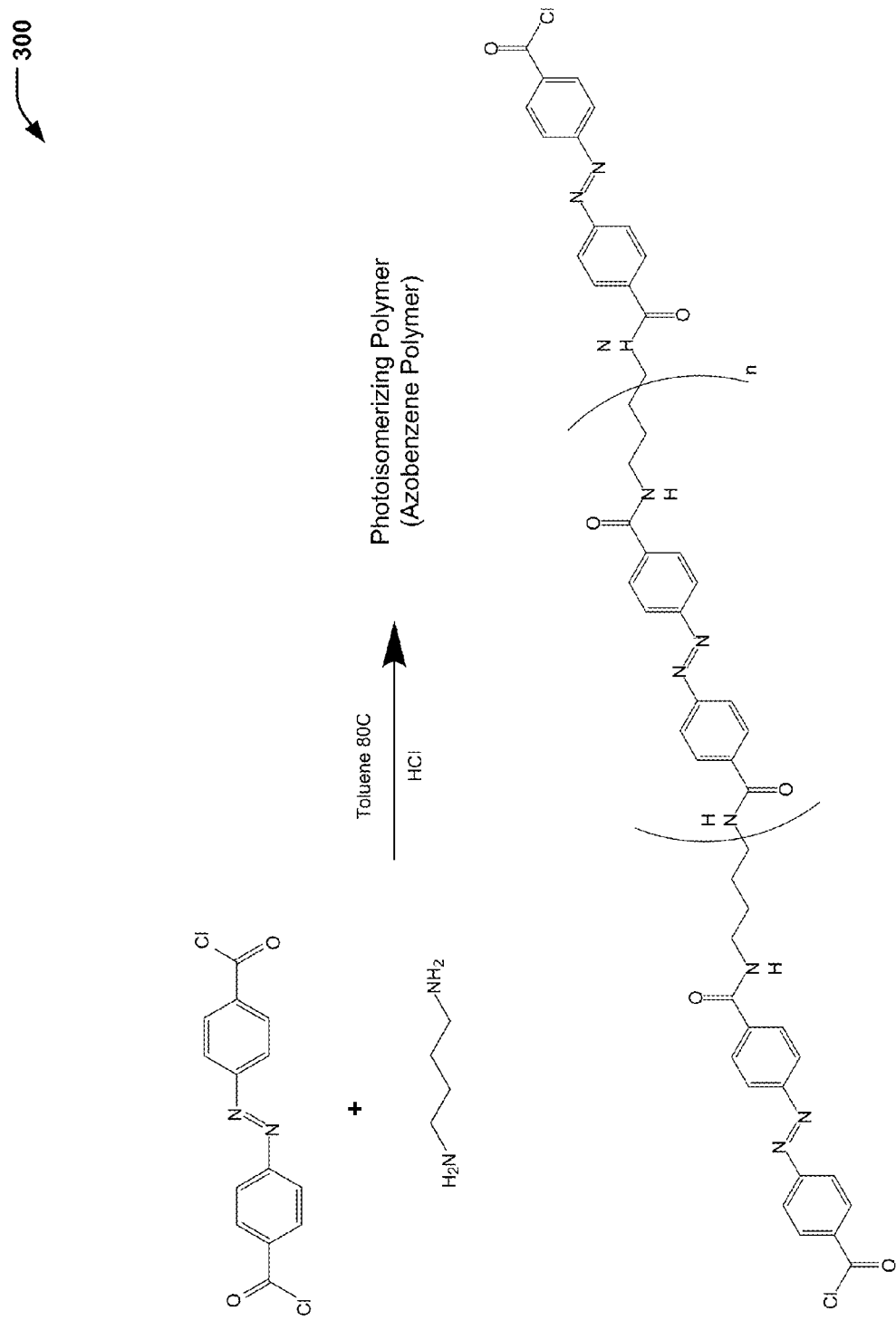
FIG. 3 is a chemical reaction diagram showing a process of forming a photoisomerizing azobenzene polymer, according to one embodiment.

FIG. 3 is a chemical reaction diagram 300 showing a process of forming a photoisomerizing azobenzene polymer. As described further herein with respect to FIG. 5, the photoisomerizing azobenzene polymer that is formed according to the process illustrated in FIG. 3 may be bonded to the first portion of a particle to form the "tail" portion of the artificial swimmer of FIG. 1 when the first portion of the particle is exposed (and the second portion of the particle is encapsulated within the wax).

The process includes chemically reacting an azobenzene material that includes at least two chlorocarbonyl functional groups with an amine to form a photoisomerizing azobenzene polymer. In the particular embodiment illustrated in FIG. 3, the azobenzene material includes azobenzene-4,4'-dicarbonyl dichloride, and the amine includes 1,4-diaminobutane. In other embodiments, alternative and/or additional azobenzene material(s) and/or amine(s) may be utilized to synthesize a photoisomerizing azobenzene polymer.

Figure 4:
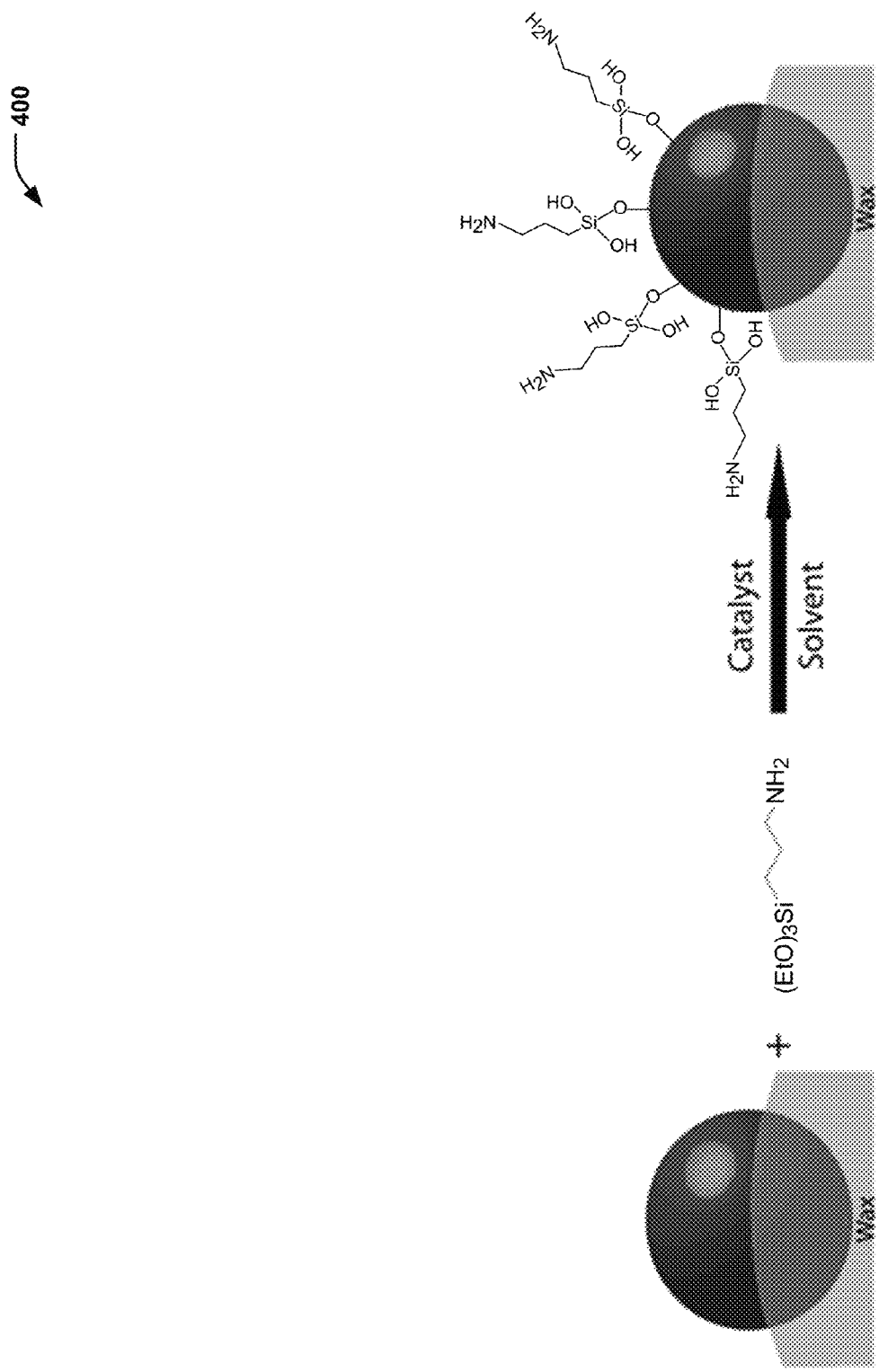
FIG. 4 is a diagram showing the addition of a functional group to a first portion of a particle for use in bonding a photoisomerizing polymer to the first portion of the particle, according to one embodiment.

FIG. 3 illustrates that the photoisomerizing azobenzene polymer has a polymer chain that includes a plurality of repeating azobenzene monomer units, represented by the integer value n. FIG. 3 further illustrates that the polymer chain includes a first chlorocarbonyl group disposed at a first end of the polymer chain and a second chlorocarbonyl group disposed at a second end of the polymer chain. As described further herein with respect to FIG. 5, the first/second chlorocarbonyl group may represent a functional group that is available for reaction with a functional group that is added to a surface of the first portion of the (silica) particle (e.g., as illustrated in FIG. 4).

While FIG. 3 illustrates the azobenzene monomer units in the trans-azobenzene configuration, it will be appreciated that individual azobenzene monomer units may undergo a first change of configuration to a cis-azobenzene configuration (e.g., when exposed to a first wavelength of light). Further, individual azobenzene monomer units may undergo a second change of configuration from the cis-azobenzene configuration to the trans-azobenzene configuration (e.g., when exposed to a second wavelength of light).

The photoisomerizing azobenzene polymer illustrated in FIG. 3 has a polymer backbone that includes azobenzene molecules. The azobenzene molecules in the backbone of the polymer (rather than on the sides of the polymer chain) allows for a helical type polymer to be formed along with having photoisomerization occur along the length of the polymer rather than inducing movement from the sides of the polymer chain. In a particular embodiment, through step growth polymerization, the azobenzene polymer may be synthesized initiator free. As an illustrative example, the resulting azobenzene polymer may be a low molecular weight polymer or a high molecular weight polymer, with the molecular weight increasing with an increasing percentage of conversion in the step growth polymerization process.

In the reaction illustrated in FIG. 3, Azobenzene-4,4'-dicarbonyl dichloride may be added in slight excess to yield chlorocarbonyl end groups. As further described herein with respect to FIG. 5, a chlorocarbonyl end group of the azobenzene polymer illustrated in FIG. 3 may allow for reaction with the functional groups added to the "tail" portion of the (silica) particle (as illustrated and further described herein with respect to FIG. 4). Molecular weight of the azobenzene polymer may be controlled by changing the stoichiometric imbalance of the reaction. If the imbalance exceeds a threshold, low molecular weight polymer may be produced.

Prophetic Example

Synthesis of Photoisomerizing Azobenzene Polymer

To a round-bottom flask containing toluene, Azobenzene-4,4'-dicarbonyl dichloride (322.49 g, 1.05 mol) and 1,4-Diaminobutane (88.15 g, 1.0 mol) are added. The Azobenzene-4,4'-dicarbonyl dichloride is added in slight excess to yield chlorocarbonyl end groups. The reaction is magnetically stirred for 24 h at 80° C. to allow the reaction to proceed. After reaction, the newly formed polymer is purified (e.g., isolated from reactants) to yield poly(N-butyl-4-((4-(methylcarbamoyl)phenyl)diazenyl)benzamide (shortened to PAB).

Thus, FIG. 3 illustrates a particular embodiment of a process of forming a photoisomerizing azobenzene polymer. As illustrated and further described herein with respect to FIG. 2, exposure to light having different wavelengths results in changes of configuration of azobenzene monomer units (along a length of the polymer chain). The changes of configuration may result in changes of spatial position of the artificial swimmer, allowing the artificial swimmer to move in various directions in solution in order to scavenge metal ions from the solution.

FIG. 4 is a diagram 400 showing the addition of a functional group to a first portion (the "tail" portion) of a (silica) particle for use in bonding a photoisomerizing polymer to the first portion of the particle, according to one embodiment. While FIG. 4 illustrates an example of the addition of amine functional groups to a silica particle, one of ordinary skill in the art will appreciate that alternative functional groups and/or particles may be utilized.

In a particular embodiment, silica particles may be produced through a modified Stöber synthesis. The silica particles serve as the "body" portion of the artificial swimmer. As such, the size and surface area of the particle may influence both swimming efficiency and chelation efficiency. Utilizing a silica precursor (e.g., tetraethoxysilane (TEOS)), ammonia, water, and a solvent may enable production of particles that have diameters in the nanometer size range up to the micron size range. By varying the water concentration in the synthesis, the particle's diameter can be varied. After synthesis, particles may be removed from their mother liquor solution to halt the growth of the particles and to obtain the desired particle size. Through the process of centrifugation and solvent washes, particles may be removed from residual catalyst and precursor monomer. Particles may then be removed from solution in vacuo for further processing.

Prophetic Example

Synthesis of Silica Particles

Particles are prepared through a modified Stöber et al. synthesis using anhydrous ethanol (200 proof), ammonia (2M), deionized water, and tetraethoxysilane (TEOS). TEOS may be distilled prior to use. Ethanol (5.38 mL) and TEOS (0.38 mL) are added to a 20 mL scintillation vial and shaken to mix. In a separate vial, 2M ammonia (3.75 mL) and deionized water (0.49 mL) are added and shaken to mix. The ammonia solution is then poured into the ethanol/TEOS solution and is left to stir for 24 h. After reaction period, particles are centrifuged and rinsed with ethanol multiple times (e.g., at least 3 times) to remove residual monomer yielding silica nanoparticles. The final molar ratio of TEOS:ammonia:water is 1.00:4.39:15.95.

In order to produce "Janus" particles (as described further herein), the particles are first modified to protect a portion (referred to as the "second portion" herein) of a surface of the particle. In a particular embodiment, such "Janus" particles may be produced using a wax emulsion technique (e.g., using a paraffin wax).

In preparation of such particles, an emulsion may be fabricated. Silica particles may then be dispersed in an ethanol/water solution at an elevated temperature (to melt the wax that will be added later) and then mixed. The particle mixture may be mixed with cetyl trimethylammonium bromide (CTAB), to partially hydrophobize the surface of the particle. A low concentration of CTAB may be used in order to avoid the creation of a bilayer at the surface of the particle. The CTAB may cause the particle to favor the adsorption at the oil-water interface. Paraffin wax may then be added to the particle suspension, and the mixture may be vigorously stirred at the elevated temperature. After cooling (e.g., to room temperature), the paraffin wax may solidify into solid droplets with the nanoparticles partially extending from the surface of the droplets (as shown on the left side of FIG. 4). The droplets (with particles extending from the surface) may then be washed with an acid to remove CTAB and to expose a "bare" silica particle surface.

In order to proceed with attaching the azobenzene polymer to the surface of the silica particle, the silica particle may be functionalized (as shown on the right side of FIG. 4). In a particular embodiment, functionalization may utilize aminopropyltriethoxysilane (APTES), for reaction with the chlorine terminated polymer chains (as shown in FIG. 3). To proceed with the surface modification of the silica particle, the colloidosomes (e.g., the wax droplets having the silica particles partially embedded) may be reacted with an APTES solution including ethanol and aqueous ammonia. One variable that can be changed, if the molecular weight of the polymer is inconsistent, is the number of amine groups reacted with the surface of the particles.

Figure 5:
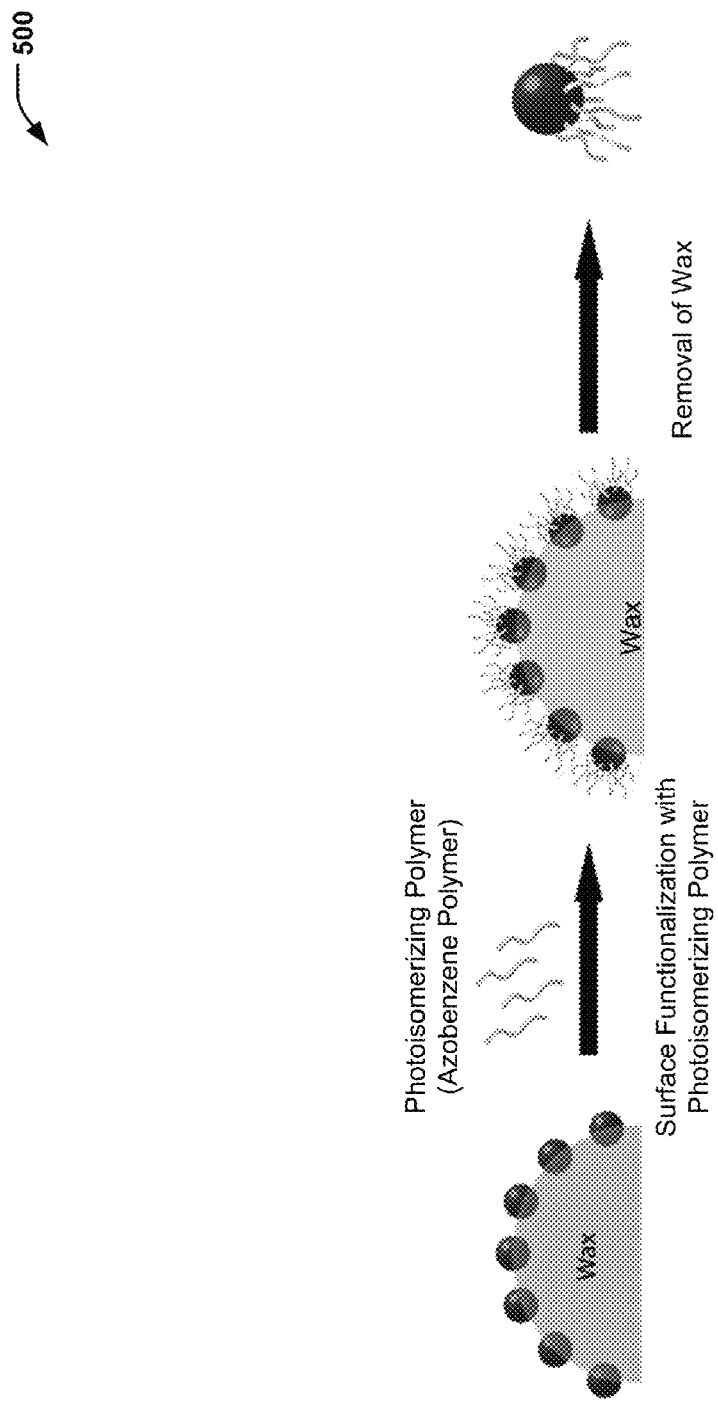
FIG. 5 is a diagram showing the addition of a photoisomerizing polymer to the first portion of the particle (e.g., via a chemical reaction with the functional group added to the first portion of the particle as shown in FIG. 4), according to one embodiment.

Thus, FIG. 4 illustrates that an exposed portion of the silica particle (corresponding to the "tail" portion of the artificial swimmer) may be functionalized (e.g., with a silane, such as APTES) to allow the photoisomerizing polymer to be attached to the silica particle (as illustrated and further described herein with respect to FIG. 5).

FIG. 5 is a diagram 500 showing the addition of a photoisomerizing polymer to the first portion of the (silica) particle (e.g., via a chemical reaction with the functional group added to the first portion of the silica particle as shown in FIG. 4), according to one embodiment.

FIG. 5 illustrates that attachment of the photoisomerizing polymer to the particle surface may be performed in a single step using the particles that have been surface modified (e.g., with APTES), as shown in the example of FIG. 4. A chlorine end group of the polymer may react with an amine group that is attached to the surface of the particle. In a similar process as the step growth polymerization described with respect to FIG. 3, the amine modified particles are reacted with the azobenzene polymer to yield the artificial swimmer in wax. As the polymer chains have two chlorine end groups, the polymer is in excess in comparison to that of the amine groups available on the surface of the particle such that (on average) one chlorine end group of the polymer reacts with an amine group on the surface (to avoid instances of both ends of the polymer chain reacting).

To surface modify the silica particle using the azobenzene polymer, the colloidosomes may be dispersed in a solvent (that does not dissolve away wax). After dispersion in the solvent, the polymer and colloidosomes may be reacted to form surface modified silica particles (shown in the middle of FIG. 5). After a reaction period, the wax droplets are filtered and washed with solvent several times to remove unreacted polymer.

The particles are removed from the wax encapsulant to yield the "Janus" type particles. A hydrocarbon solvent, such as benzene, may be used to dissolve away the wax. The particles may be centrifuged and decanted numerous times to yield the artificial swimmers free of wax (as shown on the right side of FIG. 5). In some cases, the particles may be stored in a solvent in order to inhibit tangling or "balling up" of the polymer, which may reduce effectiveness of the artificial swimmer.

Prophetic Example

Silica Particle Functionalization with PAB

Silica particles with PAB are prepared using a modified Perro et al. paraffin-in-water emulsion. Silica particles are dispersed in an ethanol/water (6.7%, w/w) solution and heated to 65° C. To the suspension, cetyl trimethylammonium bromide (CTAB; $C_{CTAB}/S_{Silica}=5\times 10-6$ mol L−1m−2−$S_{Silica}$) is added. Paraffin wax (1.0 g, CAS no. 8002-74-2) is added to the suspension. Once the wax has melted, the mixture is vigorously stirred (9000 rpm) for 80 seconds to form an emulsion. The emulsion is then allowed to cool to room temperature to form solid droplets of paraffin wax with embedded silica particles. The paraffin wax droplets are filtered and dispersed into toluene (20 mL) and stirred to form a suspension. To the suspension, (3-aminopropyl)triethoxysilane (APTES; 2.0 mL) is added. The reaction is heated to 45° C. and stirred for 48 h. The suspension is then cooled to room temperature to form solid droplets of paraffin wax with embedded APTES-modified silica particles. The solid paraffin wax droplets are then filtered and dispersed into toluene (20 mL) and stirred to form a mixture. Next, PAB (0-10 wt %) is added and the mixture is heated to 35° C. The mixture is allowed to react for 48 h followed by filtration and washing of the paraffin wax droplets with ethanol. Finally, the paraffin wax droplets are dissolved in dichloromethane (DCM) to yield PAB-modified silica particles.

Thus, FIG. 5 illustrates that the photoisomerizing polymer may be bonded to the "tail" portion of the (silica) particle via a chemical reaction of a chlorine end group of the polymer (as shown in FIG. 3) with an amine group that is attached to the surface of the particle (as shown in FIG. 4). FIG. 5 further illustrates that, after bonding the photoisomerizing polymer to the "tail" portion of a particle, the particle may be removed from the wax encapsulant in order to expose the "head" portion of the particle. As illustrated and further described herein with respect to FIG. 6, a chelating material may be bonded to the exposed "head" portion of the particle, resulting in formation of the artificial swimmer illustrated and described further herein with respect to FIGS. 1 and 2.

FIG. 6 is a diagram 600 showing the addition of a chelating material to a second portion (the "head" portion) of the (silica) particle, according to one embodiment. The chelating material (e.g., a silane, such as (3-mecaptopropyl)trimethoxysilane) may be utilized for the chelation of heavy metal ions from solution (as illustrated and further described herein with respect to FIG. 2).

FIG. 6 illustrates that the particles produced in FIG. 5 (with the polymer formed on the "tail" portion) may then be modified using a single step modification. To illustrate, as the (silica) particle formed according to the process described with respect to FIG. 5 is partially surface modified, the chelating material may attach to the second portion (the "head" portion) of the particle that is exposed after removal of the particle from the wax encapsulant. For chelation of transition metal ions from a solution (as illustrated and further described herein with respect to FIG. 2), (3-mecaptopropyl)trimethoxysilane may be selected as the surface modifier. This chelating material is useful for the chelation of heavy metal ions such as mercury, silver, lead, cadmium, and thallium (among other alternatives).

Prophetic Example

Silica Particle Surface Modification with Chelating Material

To a round-bottom flask, ethanol (20 mL) is added and stirred (e.g., with a magnetic stir bar), and 1 g of PAB-modified "Janus" silica particles is added followed by the dropwise addition of (3-mecaptopropyl)trimethoxysilane (MPTES, 0-10 wt %) to the mixture. The mixture is then allowed to react for 24 h at 50° C. After reaction, the mixture is cooled to room temperature and then filtered and washed with ethanol several times to remove excess MPTES. The final product (the artificial swimmer) is then dried in vacuo.

Thus, FIG. 6 illustrates a process of bonding a chelating material to the "head" portion of the (silica) particle for use in scavenging metal ions from solution. As illustrated and further described herein with respect to FIG. 2, the changes of spatial position of the artificial swimmer resulting from the changes of configuration in the "tail" portion of the artificial swimmer may allow the chelating material to capture metal ions from solution at various spatial positions within the solution.

FIG. 7 is a flow diagram that illustrates a particular embodiment of a process 700 of removing metal ions from a solution. In a particular embodiment, the process 700 illustrated in FIG. 7 may correspond to the metal ion scavenging process illustrated and further described herein with respect to FIG. 2.

The method 700 includes adding a composition of matter to a solution that includes a plurality of metal ions, at 702. The composition of matter includes a particle (e.g., a silica particle), a photoisomerizing polymer bonded to a first portion of the particle, and a chelating material bonded to a second portion of the particle. The chelating material includes one or more functional groups to bond one or more metal ions of the plurality of metal ions to the second portion of the particle. For example, referring to FIGS. 1 and 2, the "artificial swimmer" includes a photoisomerizing polymer bonded to a first portion of a (silica) particle (corresponding to a "tail" portion of the artificial swimmer) and a chelating material bonded to a second portion of the (silica) particle (corresponding to a "head" portion of the artificial swimmer).

The method 700 includes exposing the solution to light having a first wavelength to induce a first change of configuration of monomer units (e.g., azobenzene monomer units) of the photoisomerizing polymer (e.g., a photoisomerizing azobenzene polymer) from a first configuration to a second configuration, at 704. For example, referring to FIG. 1, the photoisomerizing polymer includes a polyazobenzene polymer that may undergo a first change of configuration from a first configuration (e.g., a trans-azobenzene configuration) to a second configuration (e.g., a cis-azobenzene configuration). As illustrated and further described herein with respect to FIG. 2, the first wavelength of light may be about 365 nm, which may induce the first change of configuration (e.g., from the trans-azobenzene configuration to the cis-azobenzene configuration).

The method 700 includes exposing the solution to light having a second wavelength to induce a second change of configuration of monomer units of the photoisomerizing polymer from the second configuration to the first configuration, at 704. For example, referring to FIG. 1, the polyazobenzene polymer may undergo a second change of configuration from the second configuration (e.g., the cis-azobenzene configuration) to the first configuration (e.g., the trans-azobenzene configuration). As illustrated and further described herein with respect to FIG. 2, the second wavelength of light may be about 420 nm, which may induce the second change of configuration (e.g., from the cis-azobenzene configuration to the trans-azobenzene configuration).

As illustrated and further described herein with respect to FIG. 2, different wavelengths of light may be used to induce changes of state of the photoisomerizing polymer in the "tail" portion of the artificial swimmer (e.g., between a trans-azobenzene state and a cis-azobenzene state). The changes of state may result in a change of spatial position of the artificial swimmer in solution in order to allow the artificial swimmer to "scavenge" metal ions from the solution via chemical bond(s) with the functional group(s) of the chelating material in the "head" portion of the artificial swimmer.

Thus, FIG. 7 illustrates an example of a process of removing metal ions from a solution utilizing a composition of matter (an "artificial swimmer") that includes a chelating material with functional group(s) to bond with the metal ion(s) in solution. The chelating material may be disposed in a "head" portion of the artificial swimmer, and a photoisomerizing polymer may be disposed in a "tail" portion of the artificial swimmer. Exposing the photoisomerizing polymer to different wavelengths of light may result in changes of configuration of monomer units (e.g., azobenzene monomer units). The changes of configuration may result in changes of spatial position in the solution (e.g., "sinking" and/or "swimming") in order to "scavenge" metal ions (e.g., transition metal ions) from solution via a chemical reaction of the functional group(s) of the chelating material with the metal ions.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A composition of matter comprising:
   a particle;
   a photoisomerizing polymer bonded to a first portion of the particle, the photoisomerizing polymer configured to undergo an isomer state change responsive to light; and
   a chelating material bonded to a second portion of the particle, wherein the chelating material includes one or more functional groups configured to bond one or more metal ions regardless of the isomer state of the photoisomerizing polymer.

2. The composition of matter of claim 1, wherein the photoisomerizing polymer includes a plurality of azobenzene monomer units.

3. The composition of matter of claim 2, wherein an azobenzene monomer unit of the plurality of azobenzene monomer units undergoes a first change of configuration from a trans-azobenzene configuration to a cis-azobenzene configuration when exposed to a first wavelength of the light.

4. The composition of matter of claim 3, wherein the first wavelength of the light is about 365 nanometers.

5. The composition of matter of claim 3, wherein the azobenzene monomer unit undergoes a second change of configuration from the cis-azobenzene configuration to the trans-azobenzene configuration when exposed to a second wavelength of the light.

6. The composition of matter of claim 5, wherein the second wavelength of the light is about 420 nanometers.

7. The composition of matter of claim 5, wherein the first change of configuration and the second change of configuration results in a first change of spatial position of the particle.

8. The composition of matter of claim 7, wherein the first change of spatial position of the particle is in a first direction that is different from a second direction associated with sedimentation after metal ion capture by the chelating material.

9. The composition of matter of claim 8, wherein:
   the azobenzene monomer unit undergoes a third change of configuration from the trans-azobenzene configuration to the cis-azobenzene configuration when exposed to the first wavelength of the light;
   the azobenzene monomer unit undergoes a fourth change of configuration from the cis-azobenzene configuration to the trans-azobenzene configuration when exposed to the second wavelength of the light; and
   the third change of configuration and the fourth change of configuration results in a second change of spatial position of the particle.

10. The composition of matter of claim 9, wherein the second change of spatial position of the particle is in a third direction that is different from the second direction associated with sedimentation after metal ion capture by the chelating material.

11. The composition of matter of claim 1, wherein the one or more metal ions include a mercury (Hg) ion, a silver (Ag) ion, a lead (Pb) ion, a cadmium (Cd) ion, a thallium (Tl) ion, or a combination thereof.

12. The composition of matter of claim 1, wherein the one or more functional groups include one or more silane groups.

13. The composition of matter of claim 1, wherein the particle includes a silica particle having a characteristic dimension in a range of about 100 nanometers to about 1 micrometer.

* * * * *